US007366684B1

(12) United States Patent
Douglas

(10) Patent No.: US 7,366,684 B1
(45) Date of Patent: Apr. 29, 2008

(54) BLIND-SUPPLY OPEN COMMERCE BUSINESS SYSTEM

(76) Inventor: William B. Douglas, 16881 W. 74th Ave., Arvada, CO (US) 80007

( * ) Notice: Subject to any disclaimer, the term of this patent is extended or adjusted under 35 U.S.C. 154(b) by 566 days.

(21) Appl. No.: 09/741,665

(22) Filed: Dec. 18, 2000

Related U.S. Application Data

(60) Provisional application No. 60/213,409, filed on Jun. 22, 2000, provisional application No. 60/172,172, filed on Dec. 17, 1999.

(51) Int. Cl.
*G06Q 30/00* (2006.01)
(52) U.S. Cl. .............................. 705/26; 705/1; 705/27
(58) Field of Classification Search .................. 705/26, 705/27, 37
See application file for complete search history.

(56) References Cited

U.S. PATENT DOCUMENTS

| 5,694,551 | A  | * | 12/1997 | Doyle et al. ................... 705/26 |
| 6,058,379 | A  | * | 5/2000  | Odom et al. ................... 705/37 |
| 6,260,024 | B1 | * | 7/2001  | Shkedy ......................... 705/37 |
| 6,263,317 | B1 | * | 7/2001  | Sharp et al. ................... 705/26 |
| 6,510,418 | B1 | * | 1/2003  | Case et al. ..................... 705/26 |
| 7,124,107 | B1 | * | 10/2006 | Pishevar et al. ............... 705/37 |
| 2002/0178069 | A1 | * | 11/2002 | Walker et al. ................. 705/26 |
| 2006/0015413 | A1 | * | 1/2006  | Giovannoli .................... 705/26 |

OTHER PUBLICATIONS

Of Washer Wars Spin on Investor Cycle, Whirlpool, Maytag Battle on Own Terms; Chicagoland; Sallie Gaines; Chicago Tribune; Oct. 31, 1999.*
Screen shots of Sears.com captured via the WayBackMachine (archieve.org) and dated Oct. 18, 1999.*
"Online Auction opens up", Carolyn Whelan; Electronic News; New York; Apr. 27, 1998 and "FairMarket Goes Live: Revolutionary Online Site Delivers Daily Business-to-Business Auctions"; Bus/Tech Editors; Business Wire; New York; Apr. 20, 1998.*
"Do-it-yourself auction format launched online by FairMarket", Dianne Tommer; Electronic Buyer's News, Jun. 29, 1998.*
"High Technology Plunking $1.5 M into Promising Start-Ups"; Ronald Rosenberg, Jan. 14, 1998.*
"FairMarket Goes Live: Revolutionary Online Site Delivers Daily Business-to-Business Auctions"; Bus/Tech Editors; Business Wire; New York; Apr. 20, 1998.*
"FairMarket Goes Live: Revolutionary Online Site Delivers Daily Business-to-Business Auctions"; Bus/Tech Editors; Business Wire; New York; Apr. 20, 1998.*

* cited by examiner

*Primary Examiner*—Jeffrey A. Smith
*Assistant Examiner*—Jason B. Dunham
(74) *Attorney, Agent, or Firm*—William W. Cochran; Cochran Freund & Young LLC

(57) ABSTRACT

A blind-supply open commerce business system provides a database where suppliers may upload product, product price and product delivery information. Products are offered for sale through a various systems where a potential buyer may view product information and price quotes for the same product from a plurality of suppliers wherein the identity of suppliers is not revealed. Price quotes reflect supplier cost plus margin. The system of the invention channels invoice and tracking information from a supplier to a purchaser without revealing the identity of the supplier. Suppliers ship products directly to purchasers. Purchasers may access order, shipping, and tracking information from a database of the invention.

5 Claims, 14 Drawing Sheets

BLIND-SUPPLY OPEN COMMERCE BUSINESS SYSTEM

RELATED APPLICATIONS

This application claims the benefit of U.S. Provisional Application No. 60/172,172, filed Dec. 17, 1999, and U.S. Provisional Application No. 60/213,409, filed Jun. 22, 2000.

FIELD OF INVENTION

The present invention pertains generally to electronic commerce methods and more specifically to a method of ordering products or services from one of a group of suppliers wherein the identity of the supplier is not revealed.

DESCRIPTION OF THE BACKGROUND

The Internet provides an avenue for electronic commerce where a potential buyer may shop for a product from one or more suppliers. This process may be simplified through a website which provides product quotes from several suppliers. Quote information may include price, types of payment accepted, shipping options and rates, taxes and other information herein referred to as terms and conditions. Pricing for products usually varies among suppliers, depending on cost to the supplier, shipping, storage, financing or other conditions. As such, the offered price for the same product is different among suppliers. Further, there may be secondary marketing companies that perform only a sales function and do not stock products. These marketing companies then obtain products from a supplier that maintains stock of the product. The marketing company charges a price higher than the cost of the product from the stocking supplier in order to pay for marketing activities and to earn a profit. Marketing companies may also provide bundling where products from more than one supplier are offered as a group. For example, a marketing company may offer a circuit breaker and accessories (e.g. wire, circuit box, circuit panel) as a group.

A supplier supplying products to a marketing company likely also offers the product for sale. The price of the product sold through the supplier may be different from the price for the product sold through the marketing company. As such, the marketing company or supplier may desire that the identity of the supplier not be revealed when the product is sold through the marketing company.

Further, a company may market the same product through different channels. A full page magazine advertisement may be expensive to produce, such that the offering price of a product in a magazine may be higher than the offering price for the same product sold through a website. In order to maintain the magazine price for the product, the supplier may choose to remain anonymous when selling the product through a website. Similarly, a supplier may sell products through a retail outlet and through the Internet. Prices at the retail outlet would likely be higher than prices offered through the Internet due to the costs of maintaining a retail store. The supplier may wish anonymity for Internet sales to help maintain retail outlet prices.

It is therefore desirable that a method of electronic commerce be provided where suppliers may sell a product through the Internet without revealing the identity of the supplier

SUMMARY OF THE INVENTION

The present invention provides a business system and method wherein products may be ordered and orders for products processed automatically without revealing the identity of the supplier. A first embodiment provides for payment of product from a customer through the system of the invention to the supplier. A second embodiment provides an escrow account for payment to the supplier.

DETAILED DESCRIPTION OF THE PREFERRED EMBODIMENTS OF THE INVENTION

Overall Description of the Invention

Figure 1:
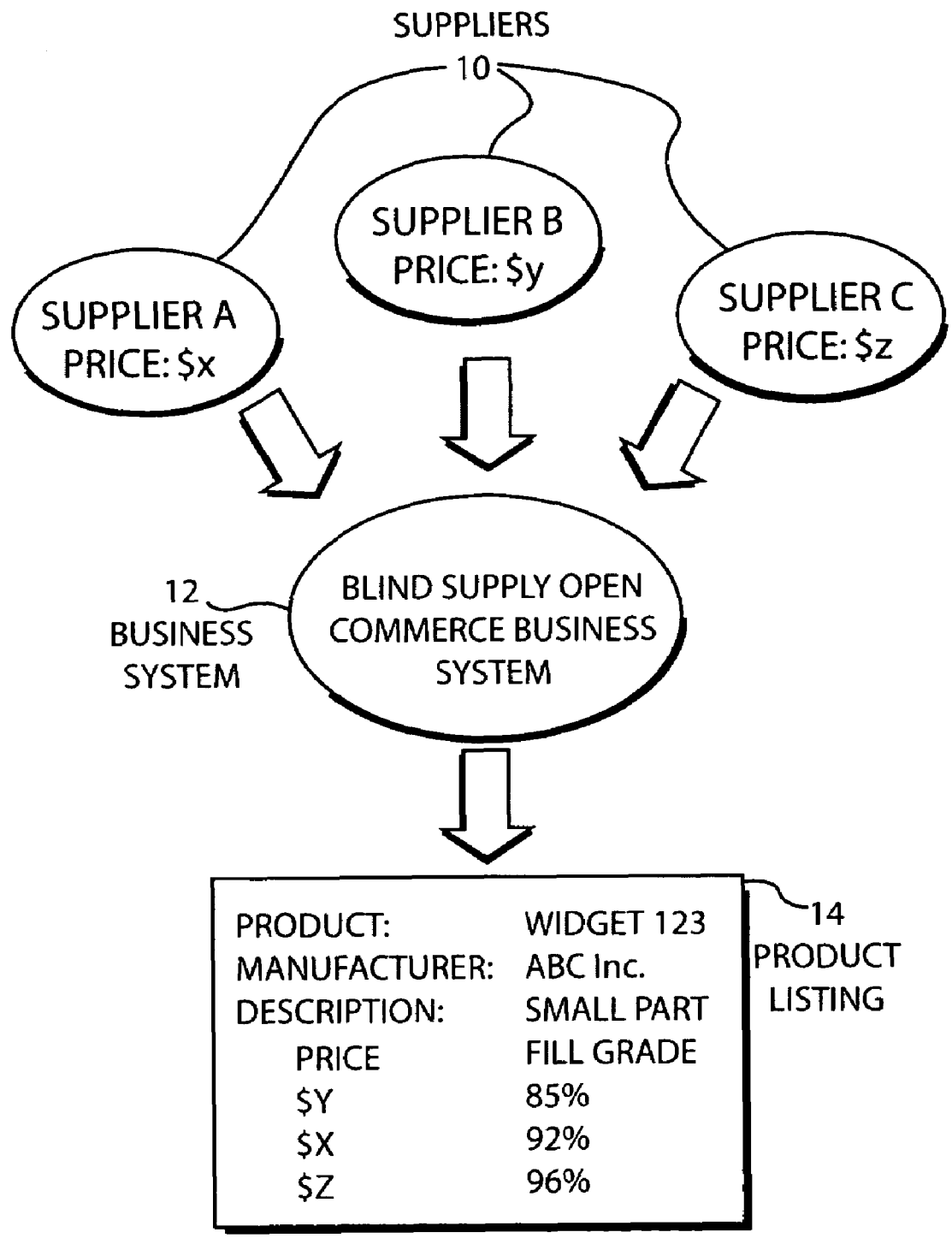
FIG. 1 shows a flowchart for quoting a price to a consumer employing the present invention.

The blind-supply open commerce business system of the present invention employs a network, preferably the Internet, to support the sale of like products from multiple suppliers to consumers. The invention comprises databases and software programs supporting functions including goods identification, price quotes, purchasing, invoice, payment, screen display, and communications. Operationally, a consumer accesses features of the present invention through an Internet website or via procurement systems linked to the invention via the Internet. The website provides functions through which a consumer may search for a product as may be identified by manufacturer, part number, product description or category description, or other information. A listing of a product or products may be provided as a result of the search. When a plurality of products is listed, the consumer may select one product and may obtain additional information on that product such as a product specification or links to where such information may be obtained. Further, once a product is selected, a list of purchasing information may be displayed. Purchasing information may include product description, manufacturer name, price, shipping costs, delivery times, and fill grade for one or more suppliers. Fill grade is a rating value reflecting how often the supplier historically fills an order in the time quoted. From the list of purchase options presented, the consumer may elect to purchase the product from one or more suppliers. The identity of the supplier is not revealed to the consumer. Products selected for purchase may be placed in a shopping cart or may be purchased individually.

When a consumer places an order using the system of the present invention, the order is forwarded to the appropriate supplier or suppliers for the exact product or products ordered by the customer. The supplier or suppliers then ship the product or products directly to the consumer. The consumer is billed for the product or products by the system of the invention. Payment from the consumer to the system of the invention may then be processed and forwarded to the supplier or may be held in escrow for some period prior to forwarding to assure product quality or that specifications are met, or that some other condition is met. The consumer may use features of the present invention to inquire as to order status, shipping date, tracking information, or other information. Access to such information may be protected by a password.

The following example illustrates the features and capabilities of the invention. A consumer wishing to purchase a circuit breaker may visit a website operatively connected to the system of the invention. The consumer may search for a specific circuit breaker or types of circuit breakers by supplying a manufacturer name, a part number, a product description, or other information. A list of circuit breakers corresponding to the search information may be displayed. The consumer may select one of the displayed products. If the consumer elects to purchase the circuit breaker, pricing from one or more suppliers is displayed. Other information such as payment forms accepted, shipping options or performance of the supplier may also be displayed. The consumer may elect to purchase the circuit breaker by selecting one of the prices listed. This may place the circuit breaker in a shopping cart or may result in the consumer being prompted to enter billing and shipping information such as a credit card number and shipping address and may include a shipping method. The system of the present invention routes the purchase order to the supplier without revealing the supplier name to the consumer. The supplier ships the circuit breaker directly to the consumer. The consumer may inquire as to the status of the order using a web connection to the system of the invention. Advantageous to the present invention is that suppliers may enter product information into the database of the invention, providing a catalog for those products.

DESCRIPTION OF THE INVENTION WITH RESPECT TO THE FIGURES

FIG. 1 shows a flowchart for quoting a price to a consumer employing the present invention. Suppliers 10 enter product and price information into a database of business system 12. Supplier prices are increased to create a profit. The information entered into the database forms in part a catalog of products, prices, availability and other information. A consumer may search the catalog or products using product part numbers, manufacturer name, product description or other information. Product listing 14 is returned as a result of a search. The catalog contains information from multiple suppliers, some offering the same product (as may be determined by manufacturer code), such that the same product may appear in product listing 14 multiple times, once for each supplier, with different available quantities at different offered prices. The supplier name is not revealed to the consumer.

Figure 2:
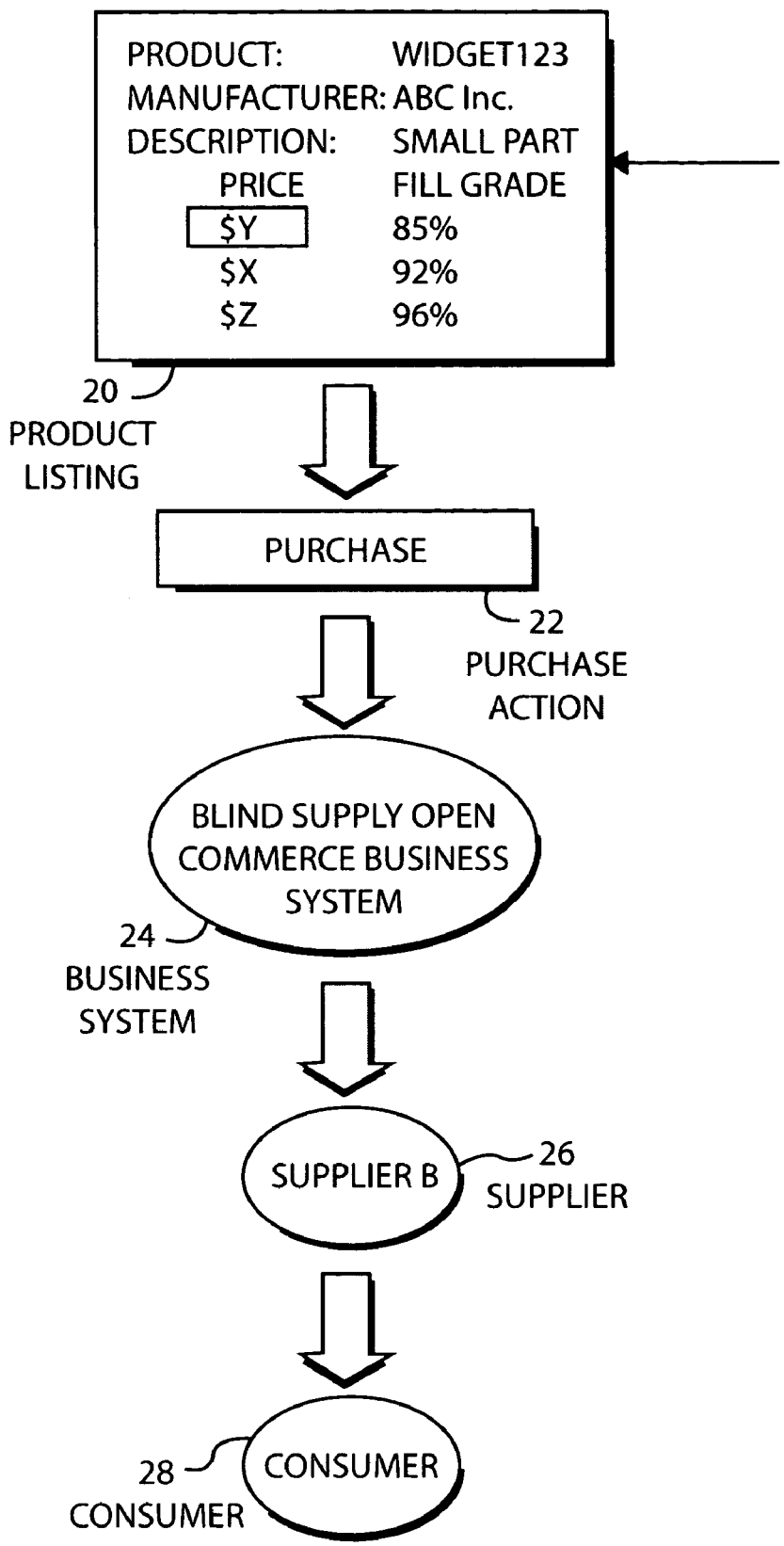
FIG. 2 shows a flowchart for purchasing a product.

FIG. 2 shows a flowchart for purchasing a product. From product listing 20, the consumer selects a product, exemplarily indicated by an arrow and box around the $Y price. After selecting a product, the consumer may be prompted to enter billing and shipping information, or to enter a password if an account containing billing and shipping information has been established for the consumer. Product and billing and shipping information are conveyed by purchase action 22 to business system 24. Business system 24 receives purchase information from purchase action 22 and forwards an order for the product to supplier 26. Supplier 26 receives the purchase order from business system 24 and ships the product to consumer 28. When supplier 26 ships the product to consumer 28, the identity of the supplier 26 may be concealed.

Figure 3:
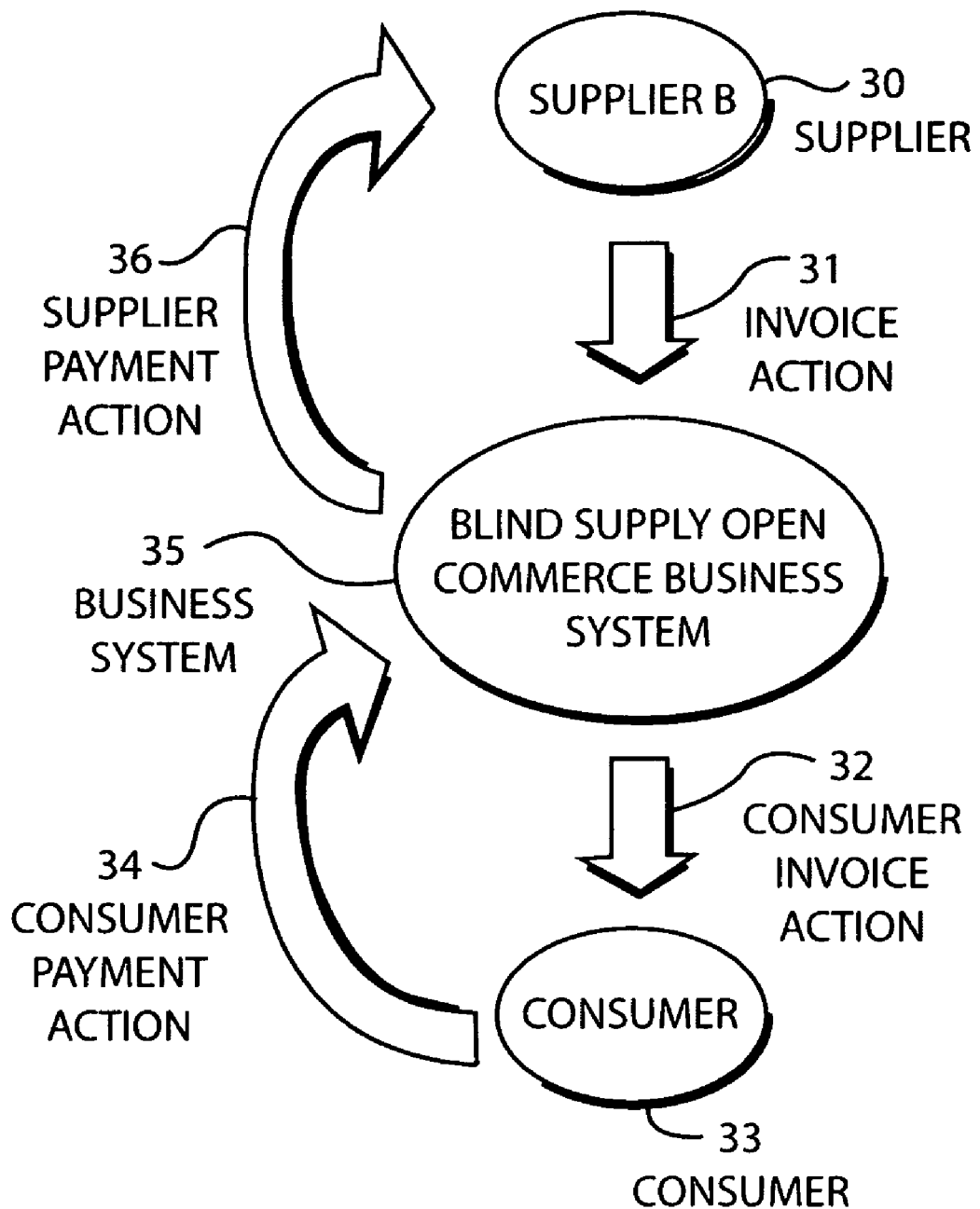
FIG. 3 shows a invoice and payment flowchart.

FIG. 3 shows an invoice and payment flowchart. Supplier 30 receives a purchase order and begins a process to ship the product to the consumer. Supplier 30 invoices consumer 33 indirectly via business system 35 through invoice action 31. Business system 35 conceals the identity of the supplier. Business system 35 invoices consumer 33 through consumer invoice action 32 wherein the identity of the supplier is concealed. Consumer 33 makes payment to business system 35 through consumer payment action 34. Business system 35 receives payment from consumer 33. In a first embodiment, business system 35 forwards payment less margin to supplier 30 through supplier payment action 36. In a second embodiment, business system 35 holds payment less margin from consumer 33 in escrow for some period prior to forwarding to assure product quality or specifications are met, or that some other condition is met.

Figure 4:
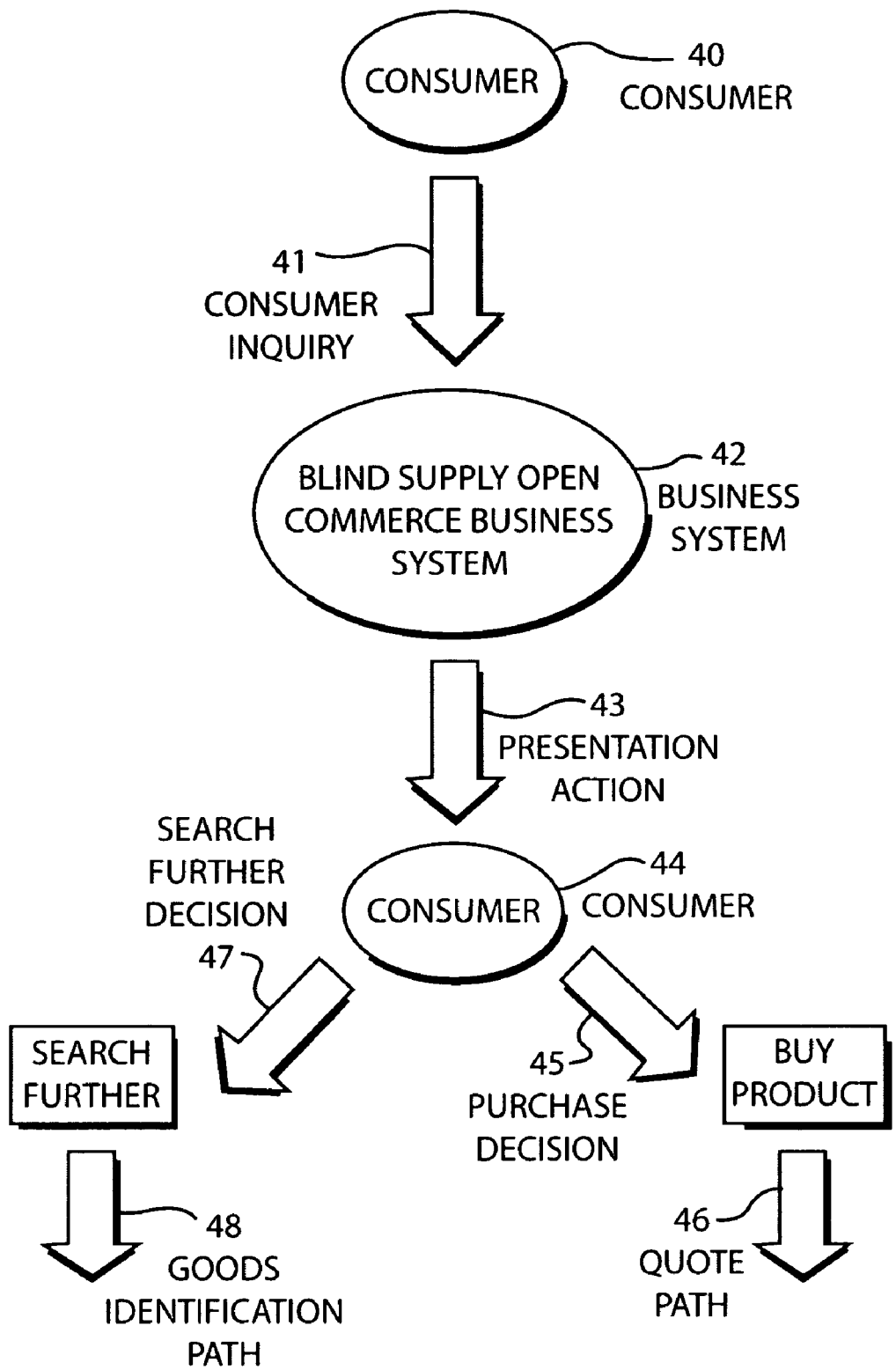
FIG. 4 shows a flowchart for product identification.

FIG. 4 shows a flowchart for product identification. Consumer 40 executes consumer inquiry 41 wherein consumer inquires by part number, manufacturer, description, UPC code, product category, or other parameter for a desired product via a web browser and a web page of business system 42. The web page portion of the present invention may operate independently of other software of the invention, allowing operation on third party websites. Consumer inquiry 41 is received by business system 42 that then processes the inquiry by querying databases, retrieving results of the query and formatting the results of the query for presentation to consumer 40 through presentation action 43. Presentation action 43 may include formatting of information for a web browser and may also include providing further production information such as specifications, for example, or links to where additional information may be obtained. Consumer 44 then may decide to purchase a product, perform additional searches, or exit the system. If the consumer elects search further decision 47 to perform additional searches, the consumer is routed through goods identification path 48 to a search screen where a new search may be performed. If consumer 44 elects purchase decision 45, the consumer is routed through quote path 46 to where price quotes may be obtained. Price quotes are described in FIG. 5.

Figure 5:
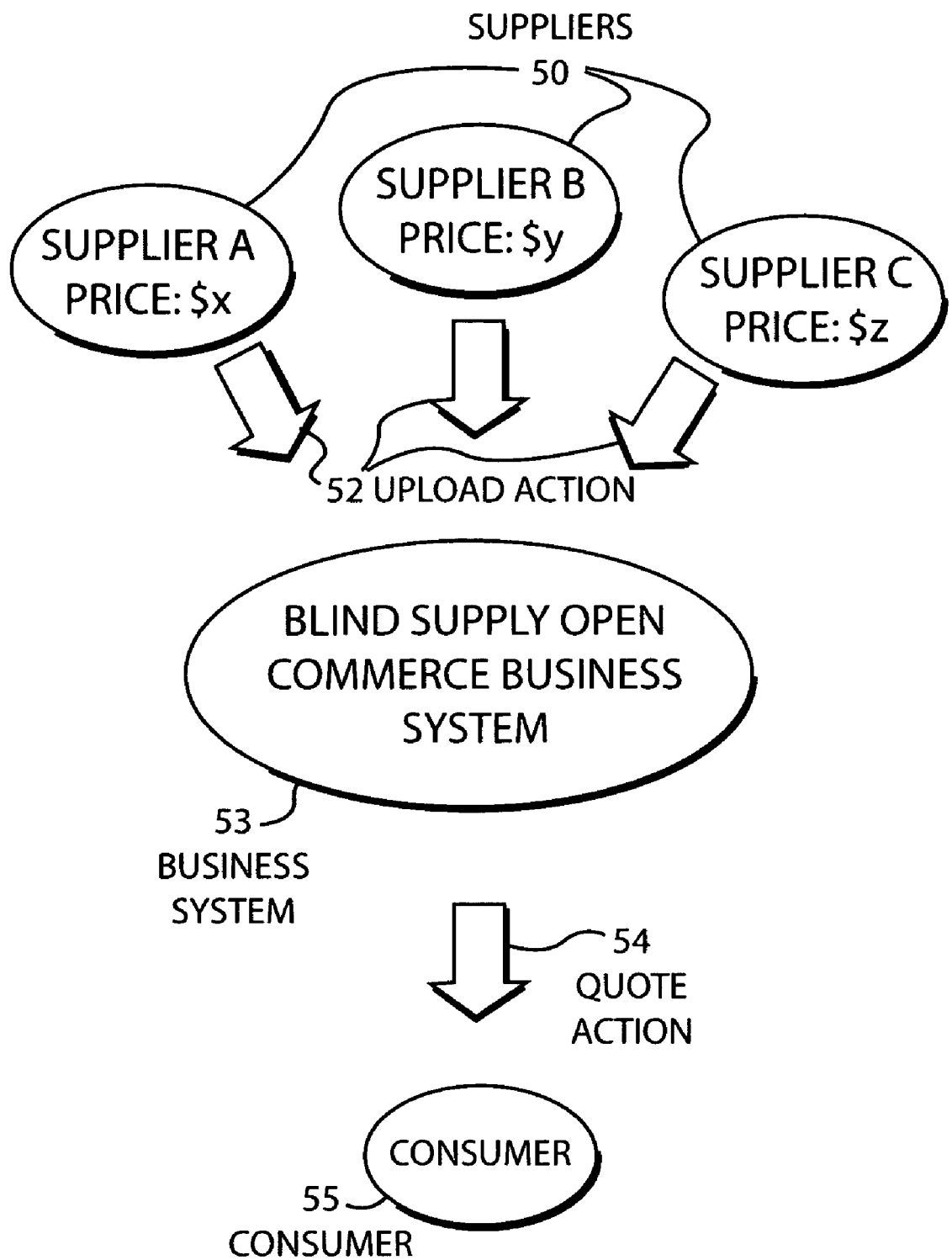
FIG. 5 shows a flowchart illustrating how a price quote is produced.

FIG. 5 shows a flowchart illustrating how a price quote is produced. Suppliers 50 perform upload action 52 to transfer product identification, price quotes and other information to business system 53. Business system 53 receives the uploaded information from suppliers 50 and updates a database, either at the time data is received or at specified time. The database may be structured to include product information and commercial information including available quantity, price and location of each product at each supplier. Quote action 54 may employ the Internet to transfer quote and product information to consumer 55 for display using a web browser. The transferred quote and product information may be formatted in a number or ways including html, dhtml, xml, Java and other formats. Consumer 55 views product and quote information and may select to purchase a product directly from the web page displayed, or from affiliate websites. The information presented to consumer 55 is generated dynamically and reflects shipping costs.

Figure 6:
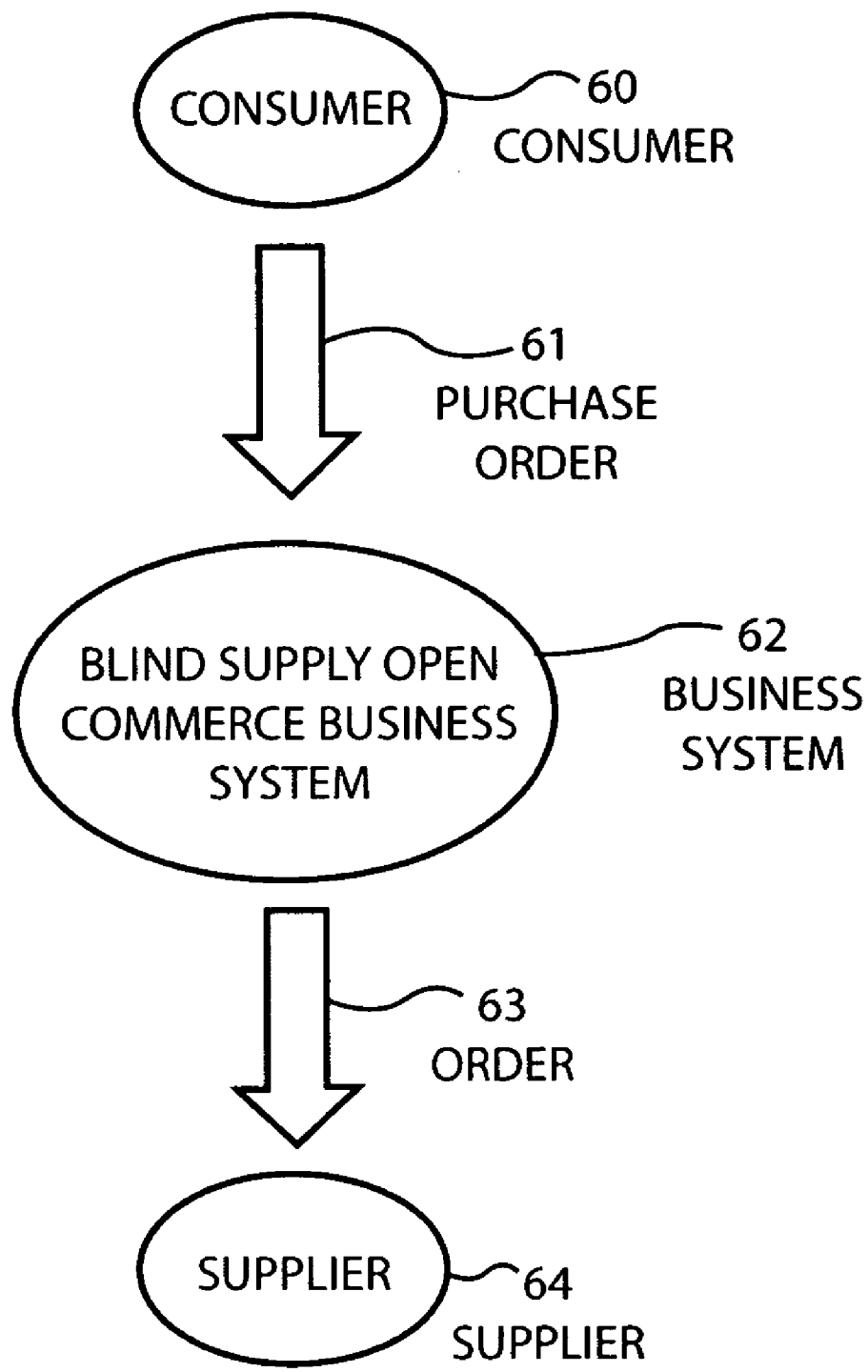
FIG. 6 shows a flowchart illustrating the technical and systems applications utilized when a product is purchased.

FIG. 6 shows a flowchart illustrating the technical and systems applications utilized when a product is purchased. Consumer 60 chooses purchase method from available choices that may include credit card, purchase order, EDI and other methods, and then submits purchase order 61 to business system 62 employing an Internet connection. Business system 62 receives purchase order 61 and updates available stock information in a database. Business system 62 forwards electronic order information to supplier 64 in order 63. Methods used to forward order 63 include Internet transmission, facsimile and others. Supplier 64 receives order 63 and proceeds to shipping product.

Figure 7:
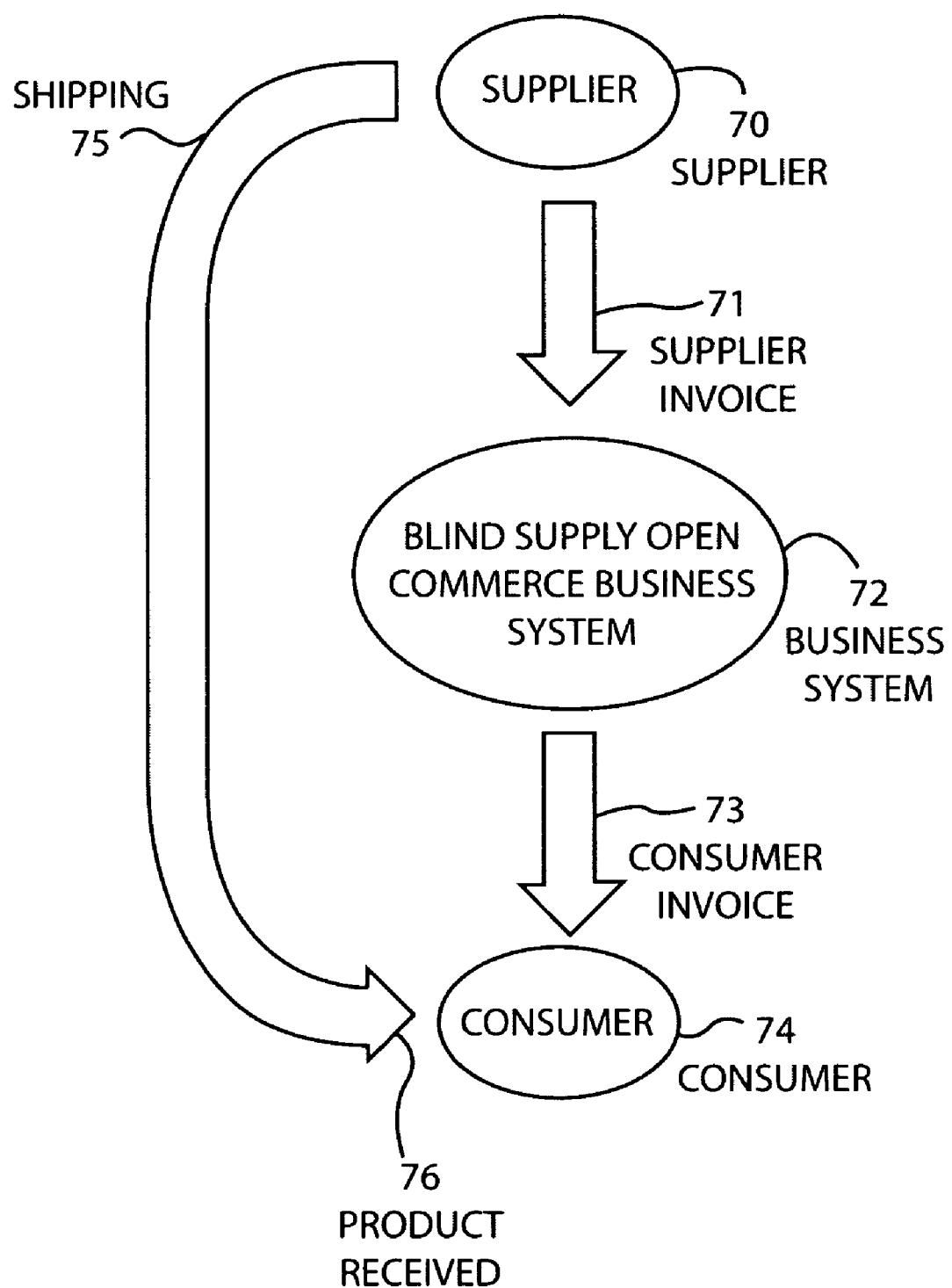
FIG. 7 shows a flowchart for shipping and invoicing.

FIG. 7 shows a flowchart for shipping and invoicing. Supplier 70 invoices consumer 74 indirectly via through business system 72 through invoice action 71. Supplier invoice 71 includes other data such as shipping verification and tracking number, for example. Business system 72 receives supplier invoice 71 and places shipping verification and tracking data and other data in a database that may be accessed by consumer 74 via the Internet, telephone, or other method. Business system 72 sends invoice 73 to consumer 74. Consumer invoice 73 amount includes supplier invoice amount plus margin. Supplier 70 ships product or products directly to consumer 74.

Figure 8:
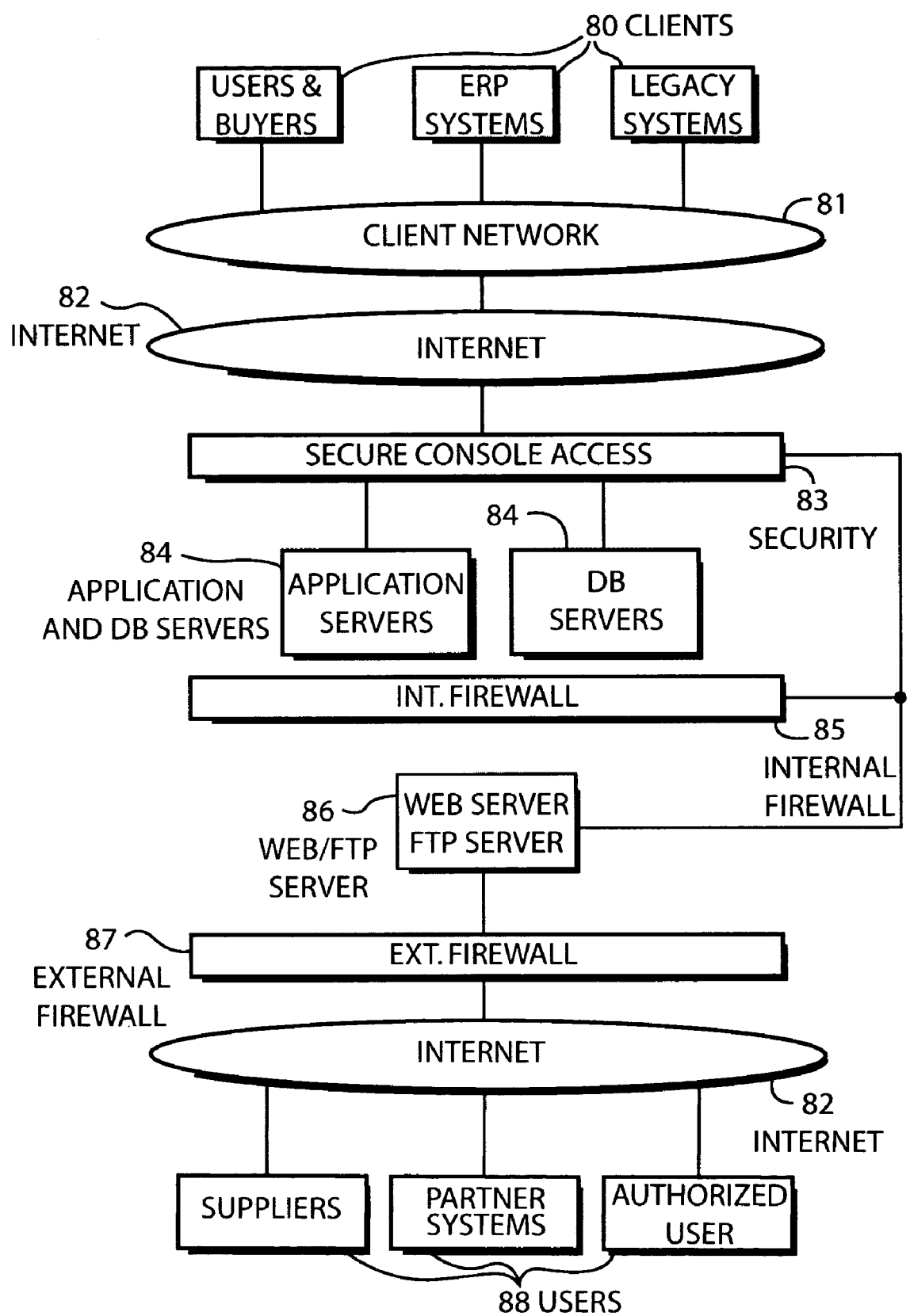
FIG. 8 shows the architecture of a system utilizing the present invention.

FIG. 8 shows the architecture of a system utilizing the present invention. Clients 80 employ network 81 to access Internet 82. Clients may include users, buyers, suppliers, other enterprise procurement system networks, enterprise resource planning (ERP), and legacy systems that may host a portion of the web interface of the invention. Security 83 is provided through a security console access component. Application and database (DB) servers 84 contain databases and software programs for providing the described features and capabilities of the business system of the invention. Internal firewall 85 protects access to databases and other areas by unauthorized individuals. Web server/FTP server 86 provides information that may be displayed using a browser plus supports FTP data transfer. External firewall 87 protects access to databases and other areas by unauthorized clients 80 or users 88. Users 88 comprise suppliers, partners systems, and other authorized users.

In more detail, the present invention is a supply chain solution (SCS) system that provides for both outbound and inbound processes and allows customers ("Buyers") to conveniently order supplies ("Products") using one visible eCommerce solution. The Buyer enters the SCS system catalog via one of a possible multiple Marketplace hyperlinks and "shops" across the catalog in order to create a single order, ultimately to be fulfilled seamlessly by at least one of a possible multiple suppliers ("Suppliers"). The Supplier may be a manufacturer or a distributor who will appear anonymous to the Buyer. The actual Purchase is made by an Administrator of the present invention and the products ordered are drop shipped by the Supplier(s) to the Buyer. The Product will be identified to the Buyer by the manufacturer name, product number and description.

In addition, instead of a Marketplace hyperlink, a third party commerce engine will be capable of interacting with ("punching out to") the SCS system and line item invoice data will be cost coded according to the third party's instructions. Also, a Supplier may be connected to the SCS system directly, i.e., without linking through a Marketplace. Such customer and supplier links and connection methods include but are not limited to ERP systems, desktop and enterprise procurement systems, private exchange marketplaces, private buyer web pages, etc.

There are four types of SCS system users: Buyers, Suppliers, Marketplaces and Administrators (pro level and std. level access). Each shall have specific functionality requirements and access levels to certain areas of the system of the present invention to complete their tasks in the process.

The Buyer comes from a Marketplace site via a hyperlink where the Marketplace graphic is loaded. The site is "powered" by the SCS system but only the Marketplace "skin" appears to the Buyer. The Buyer can search for items in the catalog, order Product, edit their account information, inquire as to transaction status, request return authorization numbers (RMAs) and obtain shipper tracking information. All of the above can be protected by a password.

The Suppliers generally will access the system to manually (or in real time) enter and update the price, description and availability of items in their SCS system catalog and to buy Product. A Supplier preferably has access to confirm a transaction, add shipper-tracking numbers, issue return authorizations and to confirm receipt of returns.

There are preferably two levels of administrator access. Administrator access gives the an account executive total access and customer service people limited access to data and the ability to approve credit, access user and order information, approve transactions with programmable parameters, process returns and other reporting and communications processes.

Marketplaces are third party businesses that provide a link to the SCS system. Typically, a Marketplace will include a network connection, such as a Web page. Marketplaces preferably have the ability to access a database of the SCS system on-line to check the following information: the number of transactions that have occurred through their hyperlink including the number of times the hyperlink is accessed, the number of orders, the dollar total of each order through this link, whether each order has been shipped/paid or not, total commission dollars paid to the site to date (if applicable) and total commission dollars outstanding (if applicable). Additional data that can be set up to be accessed to the Marketplace includes: the products ordered, the buyer contact information and buyer information sorted by region in which they operate.

The present invention further includes SEARCH, SELECTION, ORDERS, RECONCILE, and CONTROL processes. These processes are then divided into Front-end (Buy) processes, those that are seen by Administrators, and Back end (Sell) processes.

The search process is for determining what products are available in the aggregated catalog of Suppliers and which Supplier has availability. Because the catalog information is imported from multiple Suppliers, some offering the same product (as determined by manufacturer code), it is acceptable to list the same product multiple times (once for each supplier) with different available quantities at different offered prices. The user should be able to search by manufacturer and/or manufacturer part number, as well as by product name/description regardless of Supplier. The Supplier name is invisible to the Buyer.

Front End (Buy Processes)—There may be only one SCS system catalog that is available on the Supplier side for a Buyer to use. Categorized search and sorting capabilities based on product types, descriptions, price, manufacturer and manufacturer part number are preferred. A detailed search utilizing additional search parameters including a search for a product by a word in the description and a search for "in stock" Products. In addition, a detailed search by geographical region of the world for Product available from Suppliers closest to the Buyer can be provided. This is done by utilizing Supplier ID and zone information in the catalog. A further option for the Buyer is a cross-reference product search. This capability provides for the cross-reference search for products that have a similar classification/key description words. This search feature shall include keyword searches as well as a description of the Product. All searching functionality is preferably provided on the Supplier side of the SCS system of the present invention.

Back End/Admin (Sell Processes)—For the sell side/catalog application provider, the capability to load and view supplier catalogs real-time (or with frequent automated batch downloads) is provided. The Product catalog will be administered online to add categories and update prices.

Administrators perform Supplier setup, which includes inputting information about the Supplier. The present invention contemplates allowing an Administrator to block specific Suppliers from updating, to block Product from being viewed (by line item) and to block Buyers from ordering via the Marketplace-linked site.

The Selection process of the SCS system allows the Buyer to determine what Products are available, compare alternatives based on set criteria and make a selection to fill the shopping cart or start a "Bookmark for later" list.

Front End (Buy Processes)—The present invention provides the capability to select multiple Products from multiple Suppliers within a single Marketplace site where the Supplier is not known. The Supplier may be the manufacturer or a distributor in the distribution channel. All product selection functionality is provided on the Supplier side of the SCS system of the present invention.

Product information includes one or more of the following: manufacturer's product number, product name, product description, units available in stock, minimum order quantity, standard unit of measure, price per unit, (quantity pricing levels in supplier wizard), freight which is based upon zone calculations, "add to cart" button and "Bookmark for later" button. All data from product information and pricing calculations is provided by 3rd party supplier catalogue. The catalogue includes a database that saves all Product information and an associated database access program. Optionally, a link to a detailed description page that shows a complete description, warranty information, manufacturer information, link to full list of items available from the same manufacturer Back End/Admin (Sell Processes)—Provides for automated e-mail notification to the Buyer upon execution of the transaction. Briefly, an Administrator views the Buyer's order and either approves or disapproves it. The approval/disapproval process can be based on a single criterion such as credit approval, or may include additional criteria. After the Administrator approves the order, the Administrator awaits receipt of the Supplier's shipping notification. This specifically means that the Supplier-provided shipping information is entered into the SCS system and the transaction is finally approved. The SCS system then completes the payment transaction and funds are deposited to an account associated with the operator of the SCS system.

Figure 9:
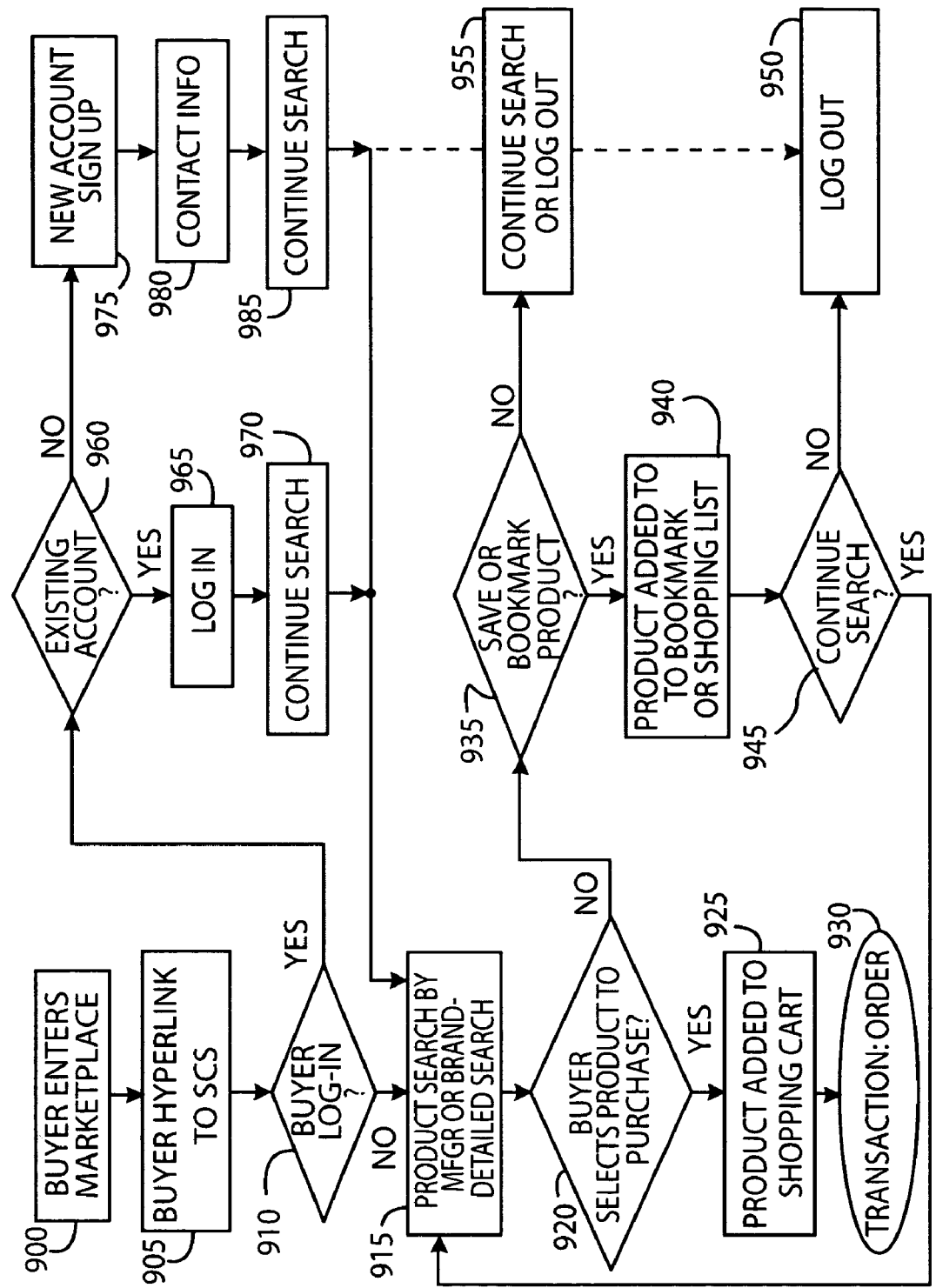
FIG. 9 shows a flowchart of search and select processes of the present invention.

FIG. 9 is a flow chart of a Product search during a Buyer transaction. At 900 a Buyer enters a Marketplace. This can be as simple as a Buyer using a Web browser to access a third party's Web site. Alternatively, the Buyer can access the SCS via software residing on a LAN or WAN, or on a desktop computer. The present invention is not limited to the ways a Buyer can access the SCS. At 905 the Buyer selects the link and enters the SCS system. As described before, the Buyer accesses the SCS system, but the Buyer still believes he/she is using the Marketplace. At 910 a determination is made if the Buyer logs into the SCS system. If no, the search process proceeds to 915 where the Buyer can still search for Product. At 920 the Buyer can select from the Product(s) shown to the Buyer through the Marketplace. If the Buyer selects a Product to purchase, then the selected Product is added to the Buyer's "shopping cart" or any other method used to save the Buyer's selections. At step 930, the SCS system proceeds to the order process, which is exemplified in FIG. 10.

Returning to step 920, if the Buyer decides not to select a Product, then the Buyer is given the option at 935 to save the information surrounding this Product search. One such method of saving is providing a bookmark for the Product. Regardless of the method of saving the information, the Buyer may later directly access such information again without going through the previous search steps. If the Buyer selects the save process, then the search information is saved at 940. The process then moves to step 945 where the Buyer is allowed to continue searching for other products. If yes, then the process returns to 915. If no, the process proceeds to step 950 to log out of the SCS system. Returning to step 935, if the Buyer selects not to save the search information, then the process proceeds to step 955 where the Buyer can decide whether to continue searching or to log out. If the Buyer continues to search, the process returns to step 915. If the Buyer decides not to continue, the process returns to step 950 where the Buyer logs out of the SCS system.

Turning back to step 910, if the Buyer selects to log in to the SCS system, the process moves to step 960 where a determination is made whether an account for the Buyer exists. Such a determination can be made by either using a cookie on the Buyers network station or obtaining from the Buyer some sort of identifying information. If an account exists, the process moves to step 965 where the Buyer is allowed to log in to the SCS system. From there, step 970 allows the Buyer to continue on to search for a Product by proceeding to step 915. However, if there is a determination at step 960 that there is no existing account, then the process proceeds to steps 975 and 980 where the Buyer can provide information, such as contact information, for signing up for an account on the SCS system. The process then moves to step 985 for the Buyer to continue on to search for a Product by proceeding to step 915.

Generally for the ordering process, if the order information is accurate and complete, the system of the present invention will accept the order and start the fulfillment process by verifying the credit or credit card information and then release the order to the Supplier(s).

Front End (Buy Processes)—Preferably, the Marketplace home page indicates a login for established Buyers via a cookie which prompts for a password, and "new account" entry link for new account information entry. Multiple ship-to and invoice-to addresses are allowed per Buyer and can be selected from a list. Login is preferably not required until order submission for Buyers that are not identified by a cookie.

For orders subsequent to the first order or registration, Buyers will be identified by the cookie and will provide a login ID and password generated by the Buyer which is supplied to them via e-mail. If they are logging in remotely from a different computer they will provide an email address that is included at Login.

The order is then assigned an order number generated by the system of the present invention at order placement that can be confirmed to the Buyer and attached to the order throughout its processing. This number should be linked in the SCS system to a purchase order (PO) if one is entered by the Buyer and to a separate Administrator's PO issued to the Supplier. The ability to check an order online by line item detail is provided. The online status check should allow a Buyer to login to verify order status and history, and to access shipper tracking number once one has been assigned and view carrier.

The Supplier is notified of the Buyer's on-line purchase order via a SCS system email and via order issued via SCS Back End processes generated at order approval/release by an Administrator, which includes the full order details. The order amount should be approved and "held" (the Buyer account is held but not charged) until shipment of the Product is sent by the Supplier to the SCS system and acknowledged by an Administrator by, for example, the order status changing to "shipped" when a shipper tracking number is added to the order information by the Supplier. This preferably also interfaces with the receivables and payables information as stated in the Reconcile process.

Back End/Admin (Sell processes)—On the backend, the order automatically is shown on an order summary log as well as in full detail when the order is selected for viewing. A full-detail order information screen includes all order information (preferably on one screen) including payment information with a link to a Buyer detail screen. Information to be supplied to the Administrator includes all information the Buyer inputs and has in their account, as well as the Supplier information and the margin, if any. It is preferred that each Supplier sends a receipt confirmation via e-mail to the SCS system. That is preferred for the case where a single order may be split out into orders sent to multiple Suppliers.

The email to the Supplier after preliminary approval by the Administrator should include the Supplier price, unit of measure, product number and name, the ship-to address, shipping instructions, carrier and method information. The SCS system creates individual POs for each Supplier. For example, a Buyer is filling a shopping cart by accessing and selecting items from the SCS system catalog. When the Buyer hits "submit" button to order the product, the shopping cart will likely contain line items from several different Suppliers. The Supplier for the item is attached to each line item and is passed on to select the product item for populating the shopping cart. Even though the Supplier is masked from the buyer, this real Supplier information is used to break the shopping cart line items into the individual PO by Supplier and passes each of those POs through the ordering channel of the SCS system.

The SCS system assigns each Buyer a unique account number, which is matched to Buyer selected passwords before order processing is allowed.

The ability exists for the Administrator to enter a shipper tracking number for each line item or to import one from the Supplier data automatically when added from the Supplier's end. Administrator account capabilities will allow access to add information regarding transactions, tracking numbers, Buyer information, and to process credit and return authorizations. When these transactions are system driven or initiated by Supplier information input, each transaction will flag an Administrator for approval for the step to proceed.

Administrator access to approve a transaction prior to sending it to the Supplier via automatic e-mail is preferred (in other words, the e-mail is generated but not sent until approved). The SCS system recognizes from which Supplier, on the catalog listing, an order was selected and to communicate that information to that Supplier.

Figure 10:
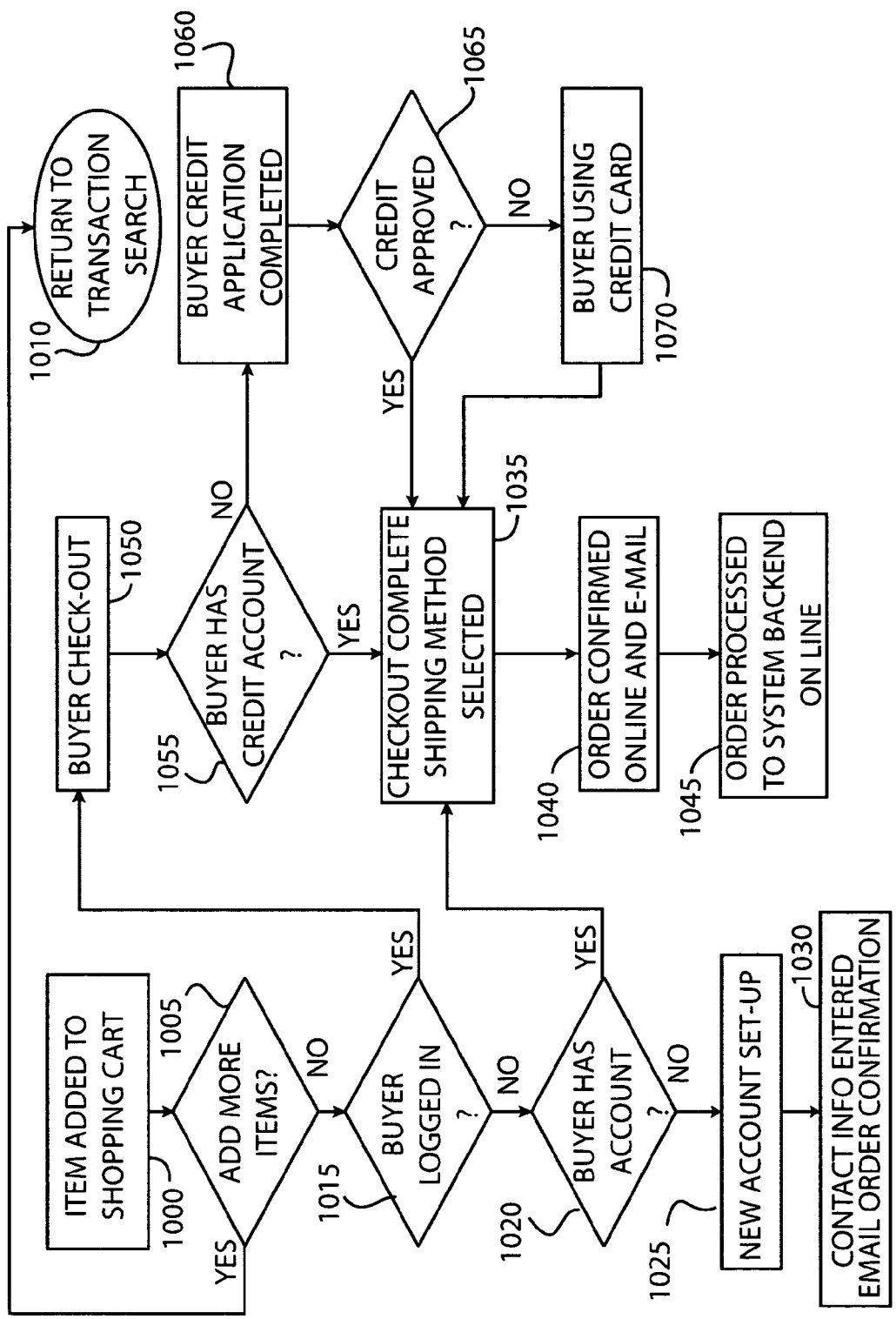
FIG. 10 shows a flowchart of an order process of the present invention.

FIG. 10 is a flow chart for one embodiment of an order process for the present invention. At step 1000, a Buyer adds a Product to his/her account, such as through a shopping cart. At step 1005 a determination is made whether the buyer desires to search for other Products or proceed with the ordering of the products already attributed to his/her account. If yes, the order method moves to step 1010 which then continues on to Product searching as exemplified by the flow chart in FIG. 9. If the Buyer decides to continue with the ordering of the Products already searched, then the method proceeds to 1015 to determine if the Buyer is logged in to the SCS system. If the Buyer has not logged in, step 1020 determines if the Buyer has an account. If not, then the process proceeds to step 1025 where a new account is set up for the Buyer. After that, step 1030 enters information, such as Buyer contact information, and informs the Supplier of the order. If the Buyer has an account, then the method proceeds to step 1035 where the checkout is completed and a shipping method is selected. Step 1040 is next where the order is confirmed online and email is sent to the Supplier and consumer to report the order information. Finally, step 1045 processes the order to the System backend where the Administrator approves or disapproves the order and takes corresponding action.

Returning to step 1015, if the Buyer is logged in, then the Buyer is checked out (i.e. verified) at step 1050. Step 1055 is next processed which determines whether the Buyer has a credit account already established with the SCS system. If yes, the process proceeds to steps 1035-1045. If no, then step 1060 is executed where the Buyer completes online a credit application. If the credit is approved at step 1065, then the process proceeds to steps 1035-1045. If the credit is not approved, then the Buyer uses a credit card at step 1070. Then the process moves to steps 1035-1045.

All transactions are reconciled to information available on-line to Suppliers, Marketplaces, Buyers and Administrators. Monetary transaction information is also communicated to an accounting system of the SCS system. After reconciling the order to the invoice, payment can occur.

The SCS system of the present invention provides the capability for the Buyer to select "standard ground" or "Express" shipping methods. The shipping quote is preferably based upon information supplied in a database by the third-party suppliers.

Further embodiments and variations of the present invention will now be described. The present invention has been described where a Buyer accesses the SCS system through a Marketplace. The Marketplace then links to the SCS system, which is unknown to the Buyer, to provide the Buyer access to the catalog database of the SCS system. The Buyer searches the catalog for products. If the Buyer desires to order a Product, the order is placed to the SCS system. The SCS system approves the transaction and sends notification to a Supplier with shipping information about the Buyer. Furthermore, the SCS system, through accounts separate from those of the Buyer's, purchases the Product from the Supplier. The Supplier then ships the Product to the Buyer. Optionally, the Buyer can be notified of the shipping information for the Product that is supplied from the Supplier. All these steps are performed while maintaining Supplier anonymity.

The Supplier provides information to the catalog database of the SCS system by uploading information either manually or automatically of the Supplier's system that maintains information about Product inventory. Such a system can include the Supplier's enterprise resource planning (ERP) system. Such systems include SAP, Oracle, PeopleSoft, Baan, JD Edwards, NexTrend, Prophet21, Prelude, Mincron, Disc, Lawson, and other ERP packages. The information provided to the database can include Product description, manufacturer code and/or number, picture, price, quantity, specifications, shipping information and return authorization.

The present invention also allows a Buyer to enable a price watch notice. Preferably, the Buyer can select a price watch feature while interacting with the database(s) of the SCS system. If the Buyer selects the price watch feature, the SCS system will store that along with the target price. When a desired Product is offered at the target price, the Buyer would then be notified. Notification can be one of several ways, like email, postal letter, telephone call, etc. At that time, the Buyer can then initiate purchase of that Product.

Also, the present invention allows for bookmarking a Product. This function saves information about a Product so that the Buyer does not have to proceed through a Product search again. Moreover, the present invention allows a Buyer to review previously placed orders. That feature, along with the bookmarking and price watch, will allow a Buyer to initiate a purchase a without searching the SCS system first. In fact, the present invention can be used where a Buyer enters an already known product into the SCS system and can initiate an order without a Product search. Thus, the present invention encompasses a situation where a Product search may not be performed.

As described above in the detailed description, various information is provided to the SCS system. A user of the SCS system may desire that the various information, which can include Buyer information, Supplier information, Product information, order information, shipping information, return information, is maintained in differently related ways. For example, the SCS system user may decide to have a dedicated database for Product information only. Similarly, the other various information can be saved in respective databases or can be saved in manners where the user believes different information is related. Thus, the present invention is not limited to a catalog database, much less a single database.

The payment transfer of the SCS system of the present invention can be implemented in various techniques. First, the Buyer may use either a credit card, credit account or other form of payment. The SCS system will check the form of payment to determine if payment is possible. If so, then the SCS system provides a PO to the Supplier. The Product invoice may be paid from the Buyer's credit card, credit account or other form of payment. The Product may also be purchased from an account or other form or payment that is associated or controlled by the user of the SCS system. After certain criteria are met, such as a time limit, successful shipment, notification of acceptance by the Buyer, etc., the Buyer's account is debited. If desired, the Buyer's account can be debited before payment is made to the Supplier.

Alternatively, the present invention can be used in a payment pass-through arrangement. The payment from the Buyer can be made to a Product supplier of the SCS system. The payment, less certain deductions, such as margin, is deposited in an account, like escrow. Then payment is made from that account to the Supplier. In this manner, the funds of the SCS system user are not tied up. Furthermore, the legal exposure of the operator of the SCS system as it relates to the title of the ordered Product is lessened. In light of this payment discussion, the present invention is not limited to the methods of transferring payments between the Buyer, SCS system and Supplier.

Figure 11:
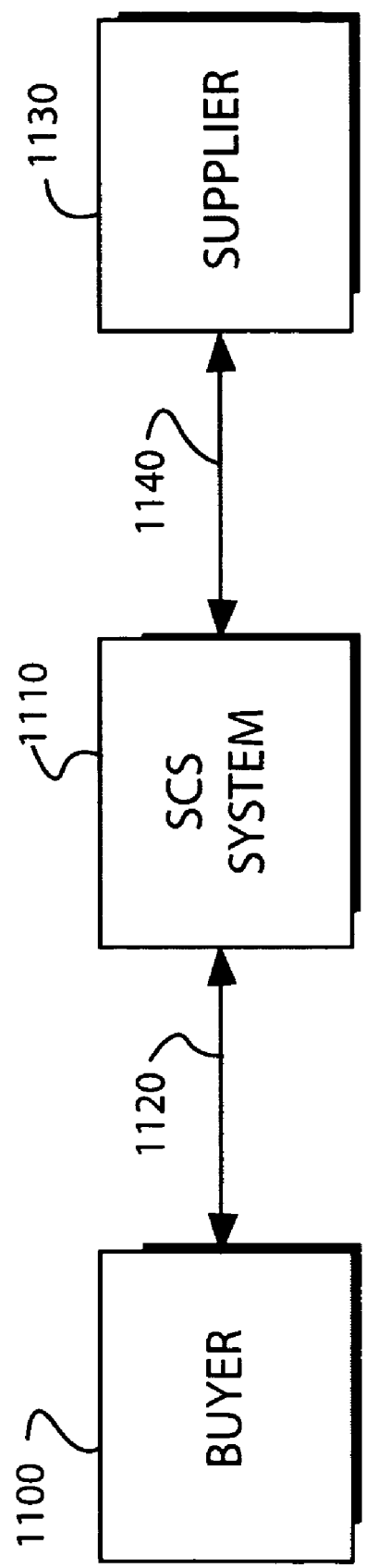
FIGS. 11-14 show other high-level embodiments of the present invention.

Although the above-description provides detailed steps, the present invention generally contemplates a purchasing system that maintains Supplier anonymity throughout the entire Product transaction, regardless of how it is purchased. Therefore, the present invention contemplates a system where at least one Buyer and at least one Supplier can communicate with the SCS system. To that end, another embodiment is shown in FIG. 11. There, a Buyer 1100 is in communication with SCS system 1110 via a communication path 1120. A Supplier 1130 is in communication with SCS system 1110 via a communication path 1140. Communication paths 1120 and 1140 can be, either individually or together, an Internet, LAN, WAN or other type of network connection, a modem connection, a wireless connection or dedicated wiring, or any combination thereof. This communication path definition will be applicable to the following description, unless noted otherwise.

Figure 12:
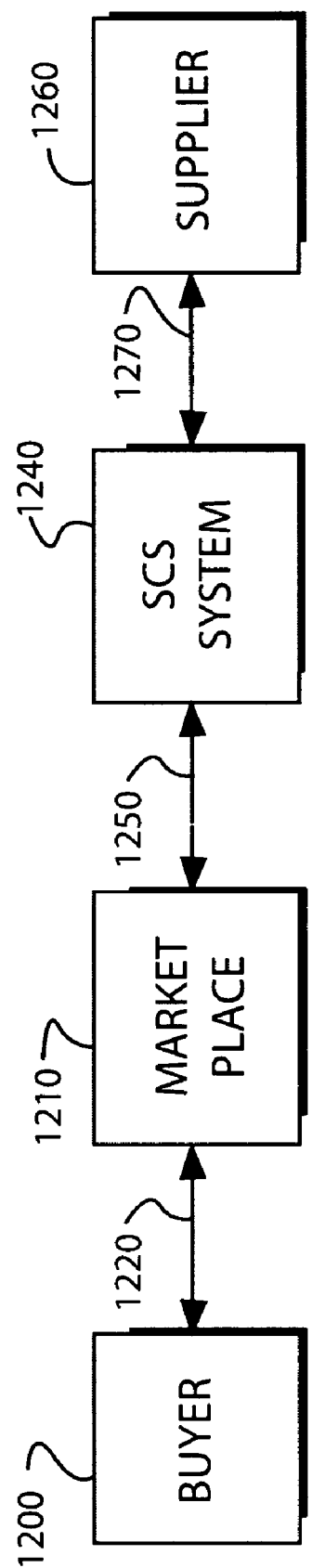

To further illustrate the present invention, reference is now made to FIG. 12. Buyer 1200 is in communication with Marketplace 1210 via a communication path 1220. In this embodiment, Marketplace 1210 is considered a third party to Buyer 1200. For example, Marketplace 1210 can be a business that operates a Web site that facilitates Product transactions. Marketplace 1210 may be freely accessed or may require a service fee. Marketplace 1210 will provide a link to SCS system via a communication path 1250. The link may be a hyperlink on the Web site of Marketplace 1210 that Buyer 1200 selects or may be automatic when the Buyer provides some input to Marketplace 1210. Regardless of the method of linking to SCS system 1240, Marketplace 1210 allows Buyer 1200 to access the catalog database of the SCS system. A Supplier 1260 is in communication with SCS system 1240 via a communication path 1270.

Figure 13:
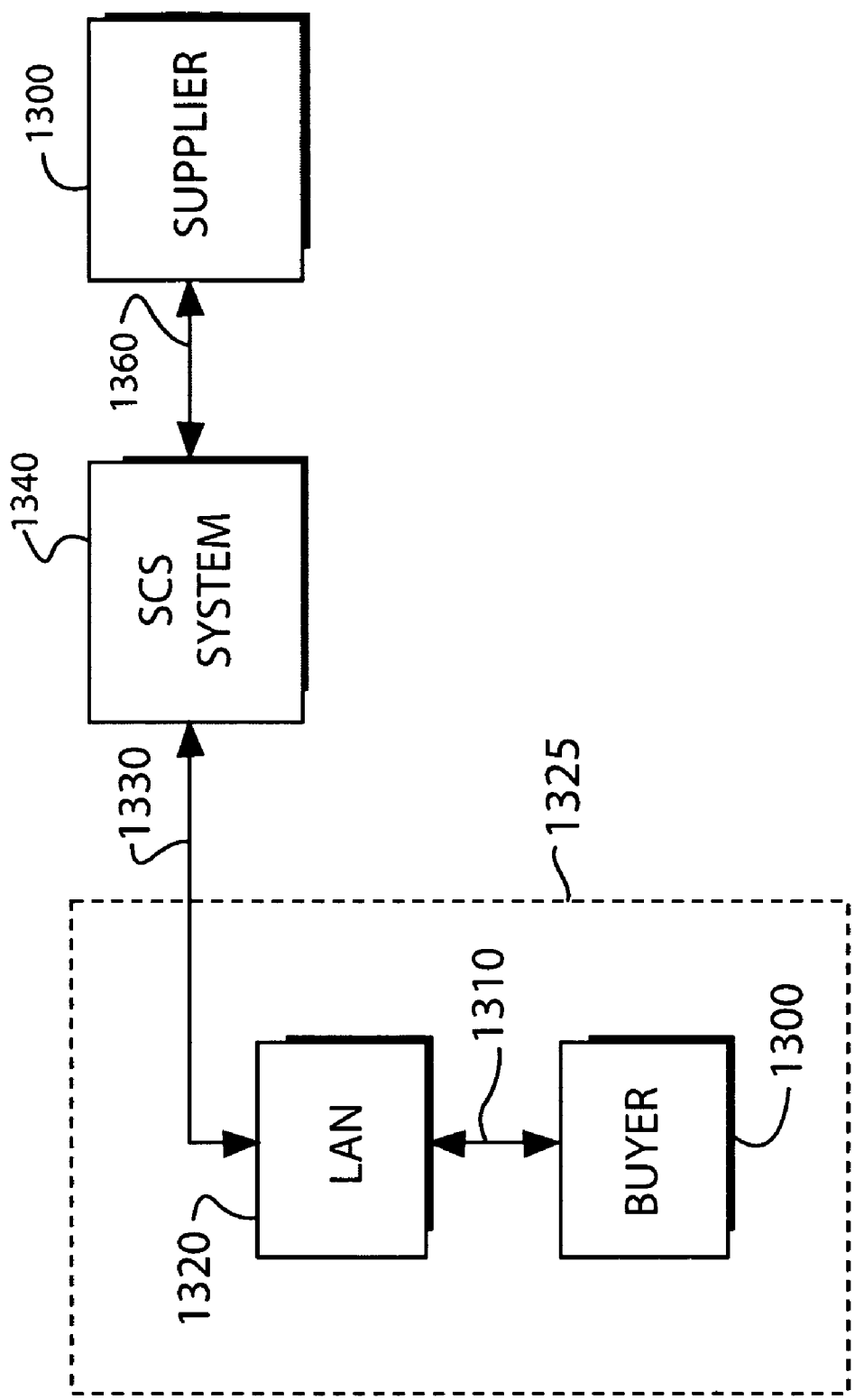

FIG. 13 illustrates another embodiment of the present invention. A Buyer 1300 is in communication with SCS system 1340 through LAN 1320 and communication paths 1310 and 1330. In this embodiment, there may be no third-party Marketplace. Instead, Buyer 1300 and LAN 1320 are included in an enterprise 1325. Enterprise 1325 may use enterprise procurement applications that are available to Buyer 1300 from LAN 1320. Such applications include the ERPs cited above as well as other procurement platforms that may include Ariba, CommerceOne, I2 and others. That application would include a link to SCS system 1340. A Supplier 1350 is in communication with SCS system 1340 via a communication path 1360.

Figure 14:
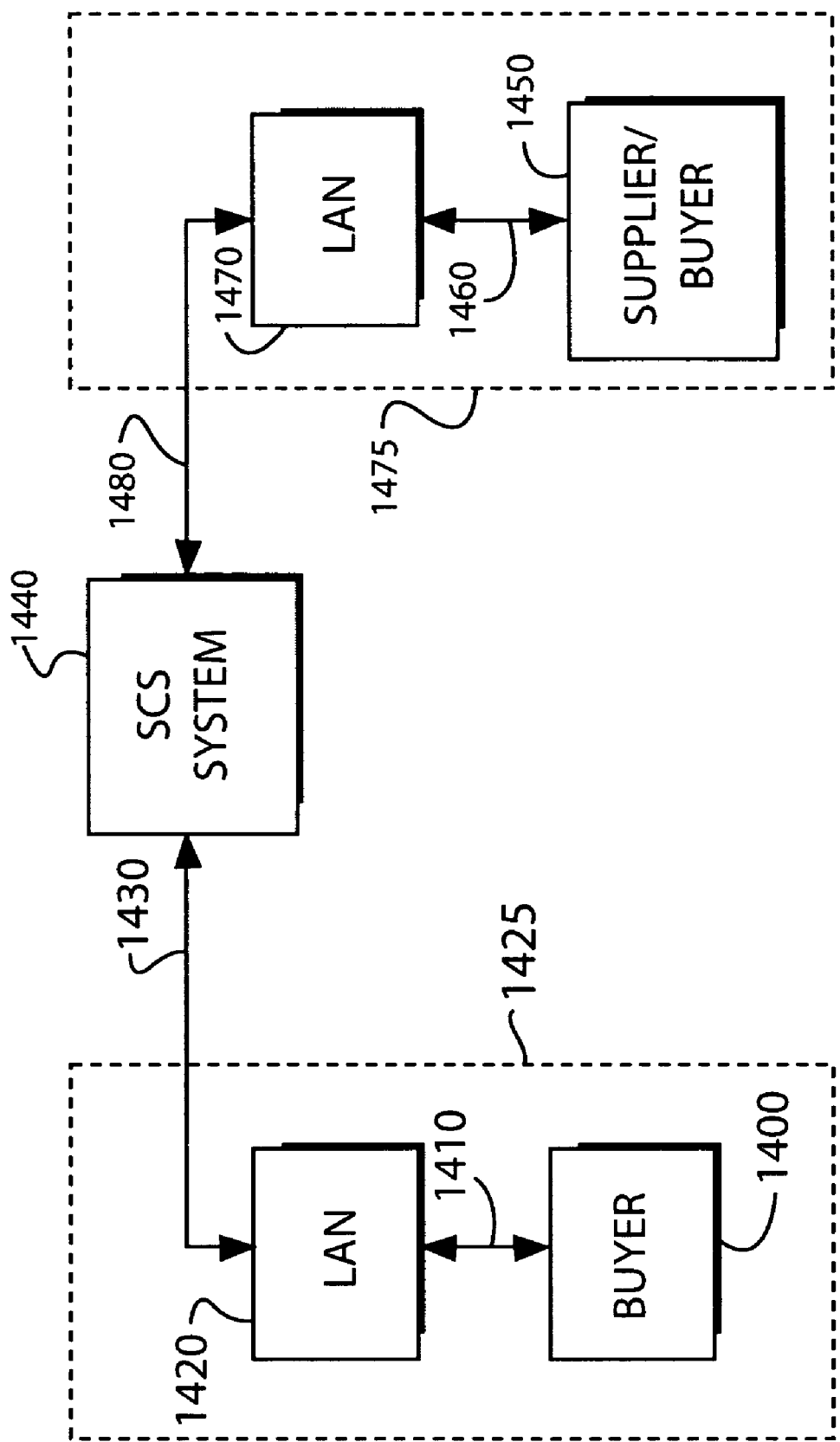

FIG. 14 will now be referenced to describe an additional embodiment of the present invention. A Buyer 1400 is in communication with SCS system 1440 through LAN 1420 and communication paths 1410 and 1430. In this embodiment, there may be no third-party Marketplace. Instead, Buyer 1400 and LAN 1420 are included in an enterprise 1425. Enterprise 1425 may use enterprise procurement applications that are available to Buyer 1400 from LAN 1420. Such applications include the ERPs cited above as well as other procurement platforms that may include Ariba, CommerceOne, I2 and others. That application would include a link to SCS system 1440. Similarly, a Supplier may also be a Buyer. In this case, a Supplier/Buyer 1450 is in communication with SCS system 1440 through LAN 1470 and communication paths 1460 and 1480. There is no third-party Marketplace. Supplier/Buyer 1450 and LAN 1470 are included in an enterprise 1475. Enterprise 1475 may use enterprise procurement applications (such as described above) that are available to Supplier/Buyer 1450 from LAN 1470. That application would include a link to SCS system 1440.

From the detailed description of the present invention, the present invention also encompasses combinations of elements of the figures as illustrated. In other words, the present invention not only encompasses the configurations shown in the figures, but also configurations that can be created from using components of the shown configurations. As a further illustration, FIG. 13 can be modified where a marketplace 1210 is disposed between enterprise 1325 and SCS system 1340. One implication of the above-description is that access to the SCS system is not limited through marketplaces via the Web.

The SCS system of the present invention has been described above in detail for several features of the system. Yet the SCS system of the present invention does not need to incorporate all those features. At a minimum, the SCS system of the present invention includes a database and an application that performs a method to provide product information, such as prices, to a customer. The price can include a margin if desired. Thus, the database and the method of providing product information allows customers to search for products and preferably obtain product prices. Referring back to FIG. 8, application and database servers 84 disclose one embodiment of the SCS system. Alternatively, servers 84 can be combined into one server for both the application and the database. In fact, any apparatus can be used to maintain the application and database of the present invention. Such apparatus include workstations, computers, PDAs, magnetic storage devices, optical storage devices and programmable electrical storage devices (e.g. PROM, EPROM, EEPROM, RAM, etc.). The application of the SCS system provides the methods of providing product information described above. Throughout the above description for the present invention reference has been made to a Buyer that is interacting with the SCS system. The Buyer, however, does not have to purchase a product—ever. In fact, a user accessing the SCS system may simply need information on a Product. Thus, the present invention is applicable to anyone who accesses the SCS system to obtain information about a product, such as actual buyers, potential buyers and informational users. Accordingly, the present invention is not limited to the type of user that accesses the SCS system. In fact, even a supplier is a user. Again, one benefit of the present invention is that supplier anonymity is maintained relative to the user accessing the SCS system.

For purposes of the present application, the term "input" shall include a user "clicking" on an icon, hyperlink or a link to the SCS system, activating an input device in response to a prompted action, such as being prompted to depress the enter key of a computer keyboard after entering information into requested fields, etc. The input is then communicated to the SCS system which may provide information back to the user providing the input. And, although information for products is most preferred, the present invention in other embodiments can provide information about services, people, etc. Once more, one of the benefits of the present invention is withholding the identification of the entity that provides the information, product, service, etc.

The products of the SCS system preferably are standardized industrial commodity goods. However, for purposes of the present invention, the products are less preferably not within that definition, and can be in any commercial situation where there are buyers and sellers of "standard", "custom," "semi-custom" or "made to order" Products. Thus, the SCS system of the present invention makes purchasing products easier by enabling real-time procurement from multiple stocking locations. The SCS system may also be utilized for the buying and selling of services.

The foregoing description of the invention has been presented for purposes of illustration and description. It is not intended to be exhaustive or to limit the invention to the precise form disclosed, and other modifications and variations may be possible in light in the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

I claim:

1. A method of selling goods of suppliers through an electronic blind supply open commerce computer business system and accepting payment for said goods comprising:
   receiving product information for said goods that is uploaded from said suppliers over a network to said electronic blind supply open commerce computer business system which includes product identification information and a set price specified by said suppliers for said goods;
   automatically calculating a fixed sales price from said set price specified by said suppliers in said electronic blind supply open commerce business computer system;
   automatically generating entries in said electronic blind supply open commerce business computer business system that include said fixed sales price and said product identification information;
   posting a listing of said goods from said entries on said electronic blind supply open commerce computer business system without revealing said suppliers so that said suppliers remain anonymous to purchasers both while said goods are posted for sale on said electronic blind supply open commerce computer business system and after said goods are sold, so that said suppliers may sell said goods on said electronic blind supply open commerce computer business system without affecting a pricing structure established by said suppliers for said goods;
   making said listings of said goods available to said purchasers on said electronic blind supply open commerce computer business system through a network connection to allow said purchasers to purchase said goods at said fixed sales price over said network without bidding in an auction;
   accepting payment of said fixed sales price for said goods from said purchasers; and
   forwarding said payment of said fixed sales price less a margin to said supplier, so that anonymity of said seller is maintained.

2. The method of claim 1 wherein said process of automatically generating entries in said system comprises the process of generating a listing of goods that includes product information comprising a part number.

3. The method of claim 2 wherein said product information further comprises a product description, product specifications, and product category information.

4. The method of claim 1 further comprising:
   automatically accepting a sales order on said electronic blind supply open commerce computer business system from a qualified purchaser that includes a purchase price that satisfies said fixed sales price;
   automatically generating a purchase order on said electronic blind supply open commerce computer business system in response to said sales order that includes said product information and said set price specified by said supplier for said goods;
   electronically transmitting said purchase order to said supplier from said electronic blind supply open commerce computer business system;
   completing the sale of said goods using said electronic blind supply open commerce computer business system.

5. A method of selling goods through an on-line blind supply computerized selling system and accepting payment for said goods comprising:
   receiving product information for said goods from suppliers of said goods over a network to said on-line blind supply computerized selling system which includes product identification information and a set price specified by said suppliers for said goods;

automatically calculating a fixed sales price from said set price specified by said suppliers in said on-line blind supply computerized selling system;

automatically generating entries in said on-line blind supply computerized selling system that include said fixed sales price, a fill grade rating of said supplier and said product identification information;

posting a listing of said goods from said entries on said on-line blind supply computerized selling system without revealing said suppliers so that said suppliers remain anonymous to purchasers both while said goods are listed on said on-line blind supply computerized selling system and after said goods are sold, so that said sellers may sell said goods on said on-line blind supply computerized selling system without affecting a pricing structure established by said suppliers for said goods;

making said listings of said goods available to said purchasers on said on-line blind supply computerized selling system through a network connection to allow said purchasers to purchase said goods at said fixed sales price over said network without bidding in an auction;

accepting payment of said fixed sales price for said goods from said purchasers; and forwarding said payment of said fixed sales price, less a margin, to said supplier of said goods, so that anonymity of said supplier is maintained.

* * * * *